US011927320B2

(12) United States Patent
Gloss et al.

(10) Patent No.: US 11,927,320 B2
(45) Date of Patent: Mar. 12, 2024

(54) SIGNAL LIGHT DEVICE OF A MOTOR VEHICLE

(71) Applicant: PO LIGHTING CZECH s.r.o., Senov u Noveho Jicina (CZ)

(72) Inventors: Tomas Gloss, Vitkov (CZ); Tomas Mateju, Bartosovice na Morave (CZ); Michal Jahunak, Koprivnice (CZ)

(73) Assignee: PO LIGHTING CZECH S.R.O. (CZ)

( * ) Notice: Subject to any disclaimer, the term of this patent is extended or adjusted under 35 U.S.C. 154(b) by 0 days.

(21) Appl. No.: 18/004,822

(22) PCT Filed: Jun. 4, 2021

(86) PCT No.: PCT/CZ2021/000023
§ 371 (c)(1),
(2) Date: Jan. 9, 2023

(87) PCT Pub. No.: WO2021/254540
PCT Pub. Date: Dec. 23, 2021

(65) Prior Publication Data

US 2023/0250933 A1 Aug. 10, 2023

(30) Foreign Application Priority Data

Jun. 15, 2020 (CZ) ........................... CZPV2020-344

(51) Int. Cl.
*F21S 43/20* (2018.01)
*F21S 43/14* (2018.01)
(Continued)

(52) U.S. Cl.
CPC ............... *F21S 43/26* (2018.01); *F21S 43/14* (2018.01); *F21S 43/195* (2018.01); *F21S 43/31* (2018.01)

(58) Field of Classification Search
CPC .. F21S 43/26; F21S 43/14; F21S 43/31; F21S 43/195
(Continued)

(56) References Cited

U.S. PATENT DOCUMENTS 7,188,988 B2 3/2007 Koganezawa
7,651,241 B2 1/2010 Lee
(Continued)

FOREIGN PATENT DOCUMENTS

CZ 2018107 A3 9/2019
CZ 2019176 A3 10/2020
(Continued)

OTHER PUBLICATIONS

International Search Report dated Sep. 9, 2021 in corresponding PCT International Application No. PCT/CZ2021/000023.
(Continued)

*Primary Examiner* — Laura K Tso
(74) *Attorney, Agent, or Firm* — OSTROLENK FABER LLP

(57) ABSTRACT

A signal light device (1) of a motor vehicle with a signal lighting unit (3) that comprises housing (1*a*) covered by cover (2) and in the housing a carrier (5) secured to the housing (la) and with its front panel (7) facing the cover (2). The carrier (5) comprises a supporting surface (22) with at least one light source (6), a front panel (7) and a thin-walled partition panel (12) situated between the supporting surface (22) and the front panel (7). The partition panel (12) comprises an input surface (20) facing the supporting surface (22) and an output surface (21) wherein the supporting surface (22) is fitted with the main reflective surface (11) to reflect light rays (10). The space between the front panel (7) and the output surface (21) and between the supporting surface (22) and the input surface (20) is only filled with air.

20 Claims, 8 Drawing Sheets

Figure 1:
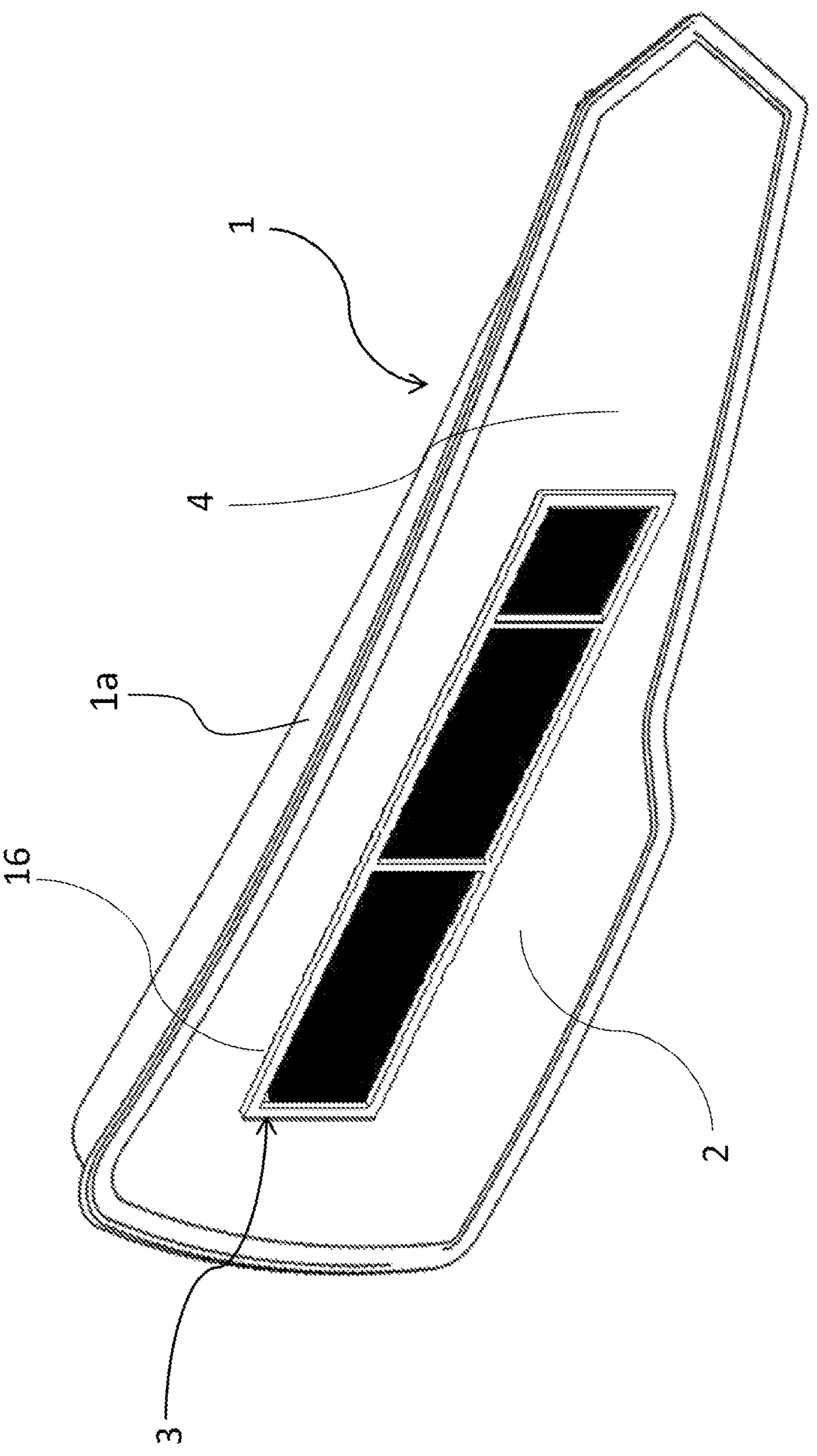

(51) Int. Cl.
*F21S 43/19* (2018.01)
*F21S 43/31* (2018.01)

(58) Field of Classification Search
USPC .................................. 362/546, 541, 540, 516
See application file for complete search history.

(56) References Cited

U.S. PATENT DOCUMENTS

| | | | |
|---|---|---|---|
| 7,663,804 | B2 | 2/2010 | Chang |
| 8,430,519 | B2 | 4/2013 | Takata |
| 8,506,148 | B2 | 8/2013 | Shimizu |
| 8,801,208 | B2 | 8/2014 | Takata |
| 9,039,244 | B2 | 5/2015 | Shani et al. |
| 9,625,641 | B2 | 4/2017 | Gourlay |
| 9,684,111 | B2 | 6/2017 | Kim et al. |
| 2006/0114690 | A1 | 6/2006 | Iki et al. |
| 2006/0262564 | A1 | 11/2006 | Baba |
| 2007/0147073 | A1 | 6/2007 | Sakai et al. |
| 2007/0165154 | A1* | 7/2007 | Whitney ........... G02F 1/133605 349/61 |
| 2008/0298072 | A1* | 12/2008 | Chang ..................... F21V 13/10 362/310 |
| 2009/0003002 | A1 | 1/2009 | Sato |
| 2010/0079980 | A1 | 4/2010 | Sakai |
| 2010/0110330 | A1 | 5/2010 | Ajichi et al. |
| 2010/0315817 | A1 | 12/2010 | Zimmermann |
| 2011/0051412 | A1 | 3/2011 | Jeong et al. |
| 2011/0149585 | A1* | 6/2011 | Dubosc .................. F21V 13/10 362/519 |
| 2012/0120672 | A1* | 5/2012 | Stagg ..................... F21S 43/14 362/293 |
| 2015/0003044 | A1 | 1/2015 | Pelka et al. |
| 2020/0172001 | A1* | 6/2020 | Muegge .................. F21S 43/40 |
| 2020/0300434 | A1 | 9/2020 | Gloss et al. |

FOREIGN PATENT DOCUMENTS

| | | | |
|---|---|---|---|
| EP | 2677237 | A2 | 12/2013 |
| EP | 3211290 | A1 | 8/2017 |
| JP | 5816908 | B2 | 11/2015 |
| JP | 5951391 | B2 | 7/2016 |
| WO | WO 2010/058625 | A1 | 5/2010 |
| WO | WO 2011/011377 | A1 | 1/2011 |

OTHER PUBLICATIONS

Written Opinion dated Sep. 9, 2021 in corresponding PCT International Application No. PCT/CZ2021/000023.
Czechia Search Report dated Oct. 23, 2020 in corresponding Czechia Application No. PV 2020-344.

* cited by examiner

SIGNAL LIGHT DEVICE OF A MOTOR VEHICLE

CROSS-REFERENCE TO RELATED APPLICATIONS

The present application is a 35 U.S.C. § 371 national stage application of International Application No. PCT/CZ2021/000023, filed Jun. 4, 2021, which claims priority to Czech Patent Application No. PV 2020-344, filed Jun. 15, 2020, the contents of which are incorporated herein by reference.

FIELD OF THE INVENTION

The invention relates to a signal light device of a motor vehicle designed to fulfil one or more signal light functions, such as brake light, tail light, daytime running light, direction indication light etc., comprising at least one signal lighting unit.

BACKGROUND INFORMATION

New vehicle lighting systems do not only focus on the optical output increasing the driving comfort and traffic safety, but it is also the appearance that is important for modern light devices of motor vehicles as headlights or signal lamps of a motor vehicle. Modern point and planar light sources, especially LED and OLED sources, have opened a new chapter for new stylistic options of car designers.

Using a planar light source, especially OLED—Organic Light Emitting Diodes—brings not only an extension of designer possibilities of the emitted light function, but it is also characterized by certain technical benefits including e.g. compact installation dimensions, low heat production, low energy consumption etc. Unfortunately, there are still some limitations of the OLED technology preventing widespread deployment of this technology in the serial production of car lighting. E.g. service life, penetration of moisture, low luminance for power functions, limitation to planar surfaces only and last, but not least, a high price. Another drawback of the OLED technology is the fact that a lamp of a motor vehicle must be adapted do detect an error status of the light source. With conventional LED's, this condition can be detected relatively well because in most cases, a short circuit or diode disconnection occurs, which results in a change of an electric quantity that can be relatively easily electronically detected. The situation of planar sources is more complicated because OLED's comprise organic layers that emit light after connection of electric voltage/current.

The documents WO2010058625A1, U.S. Pat. Nos. 9,684,111B2, 9,625,641B2, 9,039,244B2, 8,801,208B2, 8,430,519B2, 7,663,804B2, 7,651,241B2, 7,188,988B2, US20100315817A1, US20100110330A1, US20100079980A1, US20070147073A1, US20060262564A1, US20060114690A1, JP05951391B2, JP05816908B2 disclose a great number of solutions using a planarly shaped lighting unit equipped with an output surface for the output of light rays wherein there is an effort to achieve a homogeneous appearance or to achieve the required light effect on the output surface while the objective is fulfilled by means of a point or linear source and an assembly of optical components associated with the light-guiding body. The disadvantage of the above-mentioned design solutions is that these lighting units are not intended to be used as external lighting equipment for motor vehicles, for which a variety of technical specifications and regulatory requirements must be met on the one hand, but there are also requirements for the size of the installation space, low manufacturing and assembly costs of such devices.

To achieve the highest possible efficiency of light devices, efficient binding of light rays to light-guiding components must be ensured. Individual optical elements as a system of refractive and reflective surfaces and interfaces of optical environments must be arranged in such a way to prevent light losses to the highest possible extent, and at the same time to create an output light trace with the required light characteristic, i.e. the required light intensity and homogeneous appearance with constant luminance all over the output surface.

Car lighting has certain specific features as it is not only the appearance and the total luminance of the lighting function that is concerned. Individual lighting functions must conform to locally valid legislative regulations (e.g. ECE, SAE, CCC etc.). Each function has different requirements for the minimal and maximal luminous intensity values at certain angles. This means that the purpose is not only to emit a certain amount of light from lighting elements. It is also necessary to emit light having certain luminous intensity at individual angles specified by the legislation. This luminous intensity is based on the minimum and maximum values in individual regulations for individual angles. A lighting function should be preferably designed in such a way to meet requirements of as many regulations as possible. So there is a certain overlap of the intervals of the specified minimum and maximum values for individual angles. In this case, a lamp or headlight can be used for more markets at the same time without changes. However, there are cases when the requirements of all regulations cannot be met with the use of a single design of a lighting function. In that case, the lighting function must be adapted to the requirements of individual markets, which results in a unique product for the particular market.

The document CZ20190176, CZ20180107 disclose design solutions using a planarly shaped lighting unit equipped with an output surface for the output of light rays wherein these lighting units are adapted to be used in lighting devices of motor vehicles. Lighting units consists of a planar light guide with an associated light source arranged at a lateral side. Binding light to the light guide from a lateral side brings installation complications as the light source must be covered with a covering mask at the edge of lighting unit. Also, these solutions exhibit a problem concerning homogeneous illumination of the output surface in case of a low design of the lighting device while this arrangement of optical components makes the use of a segmented light module with multiple independent segments/sectors impossible.

SUMMARY OF THE INVENTION

The above-mentioned drawbacks are mitigated or removed by a signal light device of a motor vehicle designed to fulfil one or more signal light functions according to the invention, comprising a housing covered by transparent or translucent cover which separates and protects the signal light device from external surroundings of the motor vehicle, the internal chamber delimited by the housing and the cover and comprising at least one signal lighting unit, wherein the lighting unit comprises:

(i) a carrier with a supporting surface to attach at least one light source to emit light rays, (ii) a front panel, one of which surfaces faces the cover and the other surface is opposed to the supporting surface, and (iii) a thin-walled partition panel situated between the supporting surface and the front panel and at a distance from them.

The thin-walled partition panel comprises an input surface facing the supporting surface and an output surface opposite the input surface. The supporting surface is fitted with the main reflective surface to reflect light rays. The space between the front panel and the output surface and between the supporting surface and the said at least one light source and the input surface is only filled with air, and for each light source, the thin-walled partition panel is, in the region situated against the light source, fitted on its input surface with the first arrangement of the first reflective surfaces and first gaps between the first reflective surfaces, and on its output surface, with the second arrangement of the second reflective surfaces and second gaps between the second reflective surfaces. The first and second reflective surfaces are configured to reflect light rays and the first and second gaps to transmit light rays. The said first arrangement and second arrangement are configured to achieve a pre-determined intensity distribution of the output of light rays from individual locations of the output surface of the thin-walled partition panel.

In one preferred embodiment, the thickness of the thin-walled partition panel is less than or equal to 2.5 mm.

The cover may be plate-like shaped and be planar or curved, and the front panel may be planar or curved.

The front panel may be approximately parallel to an opposing part of the cover.

The thin-walled partition panel is preferably optical foil.

In one of preferred embodiments, the thin-walled partition panel, the main reflective surface and the front panel are approximately parallel.

Preferably, the distance between the main reflective surface and the thin-walled partition panel is 0.5 mm to 5.0 mm and the distance between the thin-walled partition panel and the front panel is between 0.5 mm and 5 mm.

The carrier is preferably of a plate-like shape, so in such a case, the signal lighting unit also has a plate-like shape wherein the thickness of the signal lighting unit is preferably from 2 mm to 12 mm.

In one of preferred embodiments, the signal lighting unit further comprises a lateral cover that closes the signal lighting unit at a side.

The inner walls of the lateral cover may be fitted with lateral reflective surfaces to reflect light rays.

The main reflective surface may for instance consist of a layer applied on the supporting surface carrier as a white colour coat.

In one of preferred embodiments, the optical axis of the beam of light rays emitted from the light source is perpendicular to the thin-walled partition panel and the reflective surface.

In another preferred embodiment, the signal light unit comprises at least two light sources carried by a common carrier. The light sources may be arranged on the carrier with gaps next to each other in the direction of the longitudinal axis of the signal lighting unit.

The signal lighting unit according to the invention preferentially uses a light source(s) of the LED type.

In one of preferred embodiments, the focal point of the light sources of the LED type is situated at a distance of 0.5 mm to 5 mm from the thin-walled partition panel.

The carrier in the signal lighting unit is preferably a PCB.

In one of preferred embodiments, the thin-walled partition panel comprises several parts arranged next to each other in the direction of the longitudinal axis of the signal lighting unit and the lateral cover is structured to embed individual parts of the thin-walled partition panel in the lateral cover to enhance rigidity of the overall structure of the signal lighting unit.

CLARIFICATION OF DRAWINGS

Figure 2:
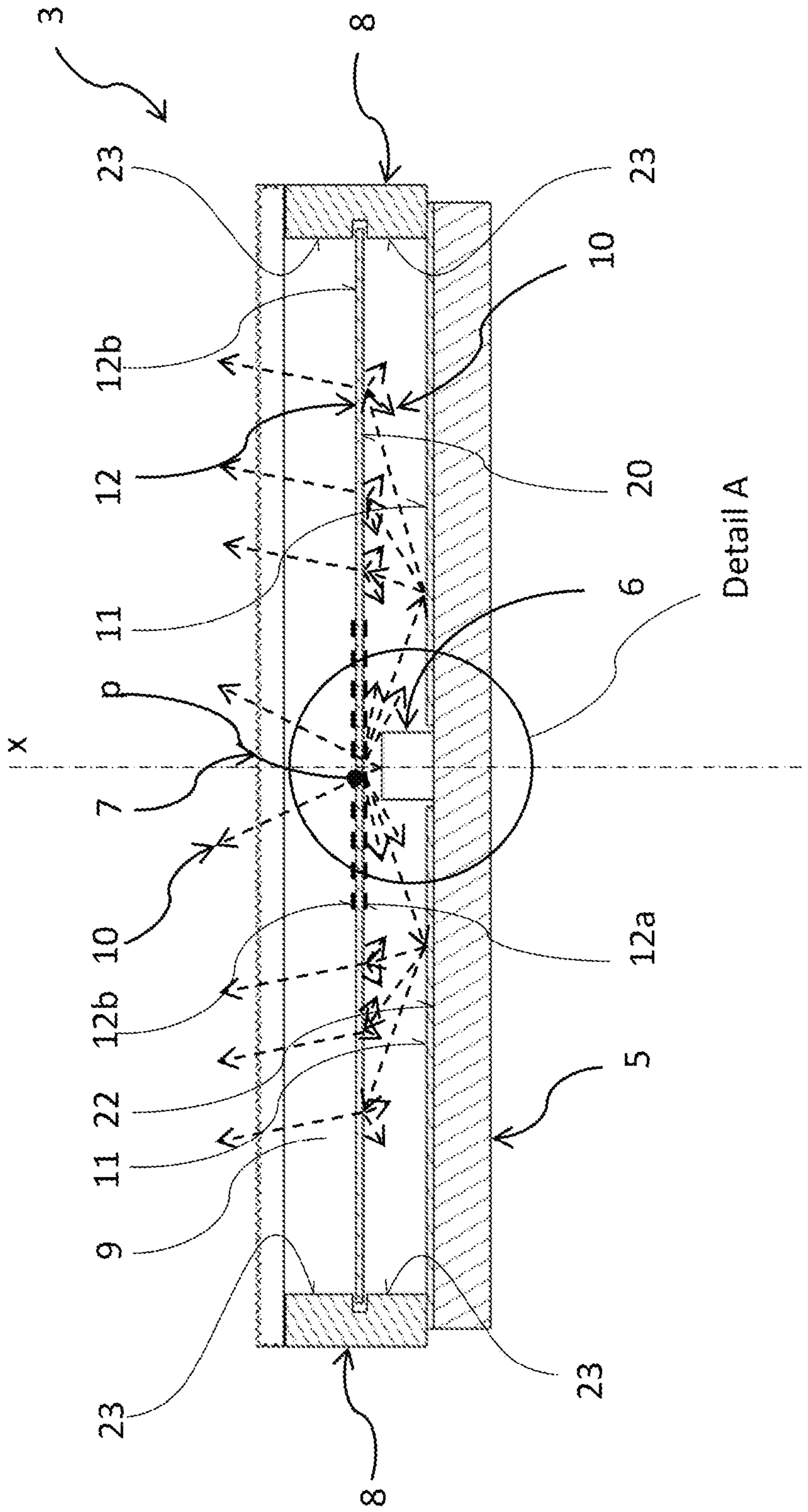
Figure 3:
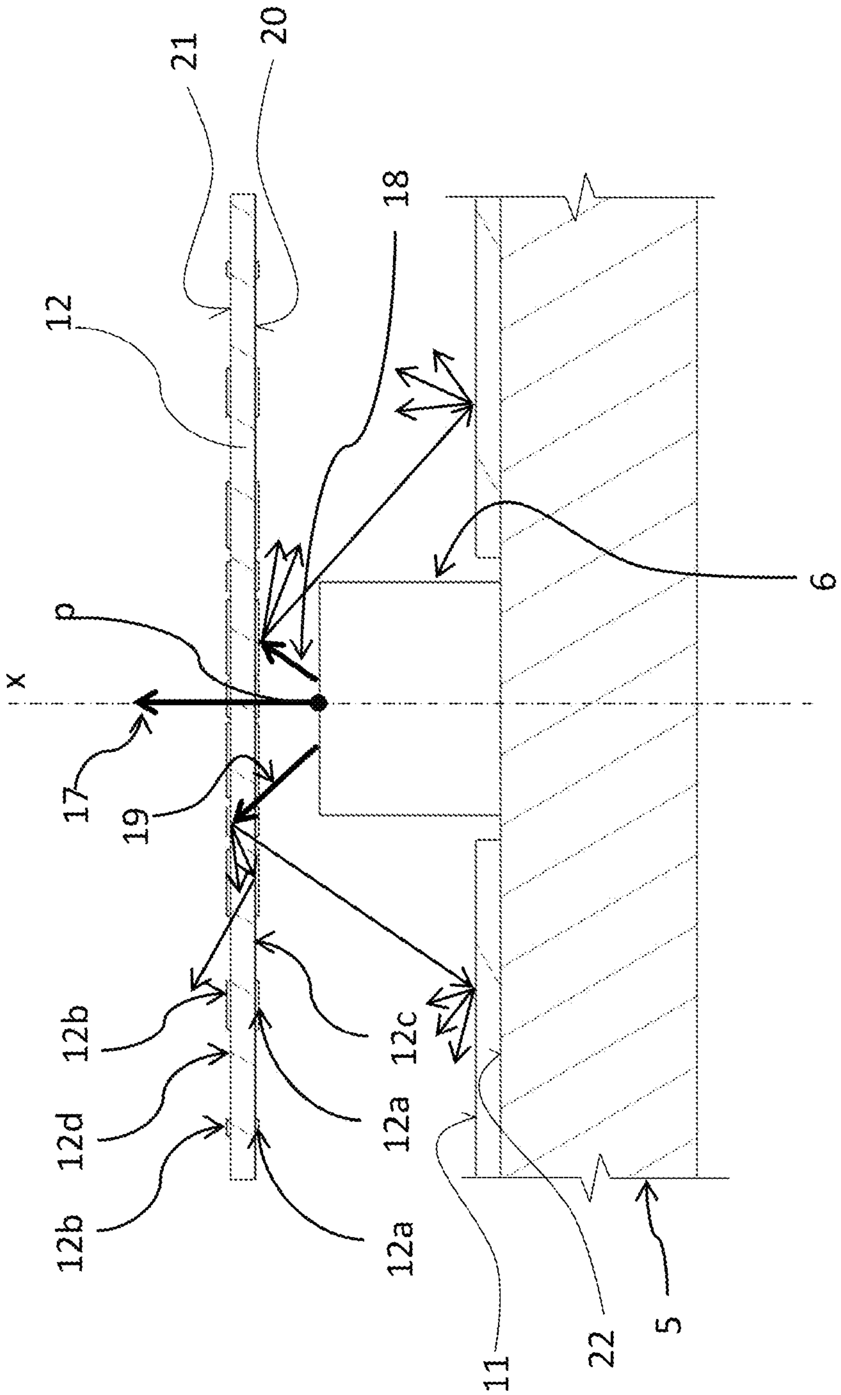
Figure 4:
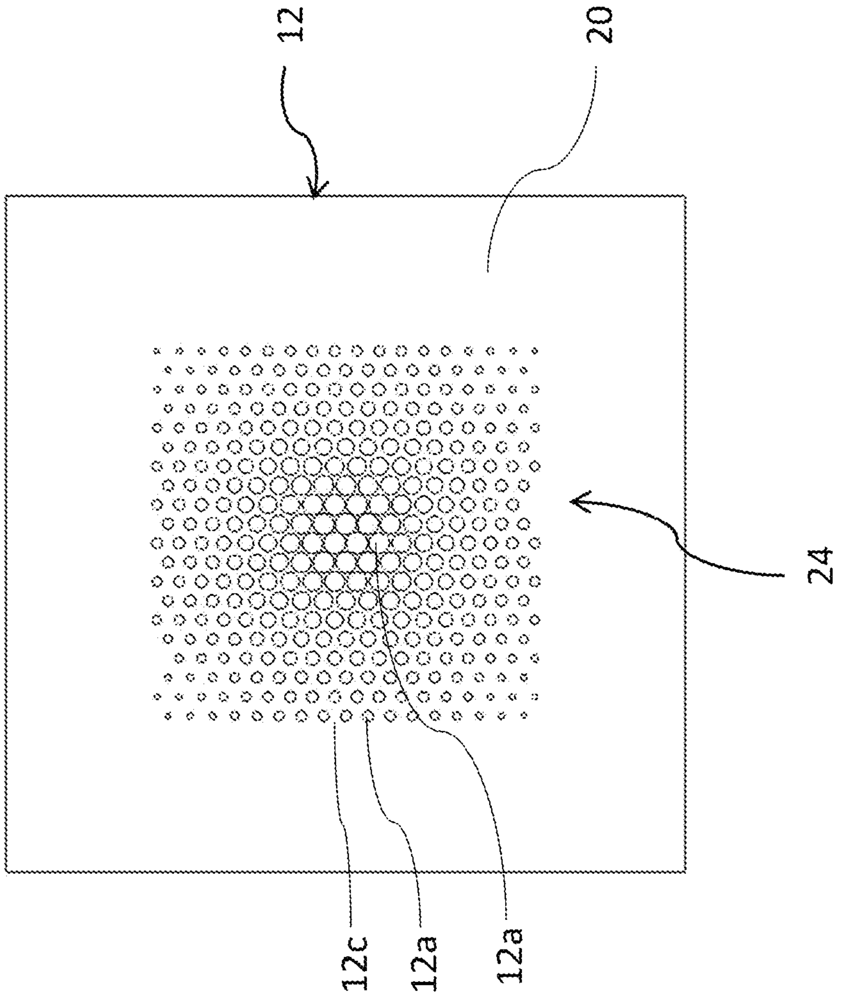
Figure 5:
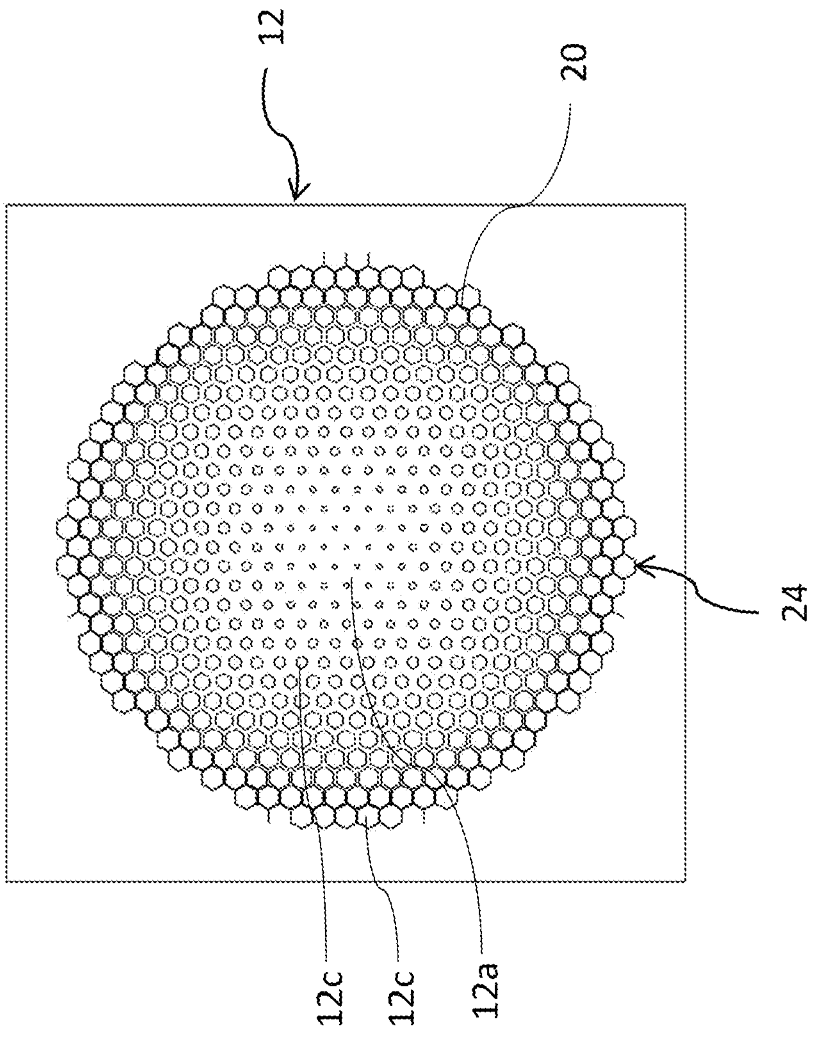
Figure 6:
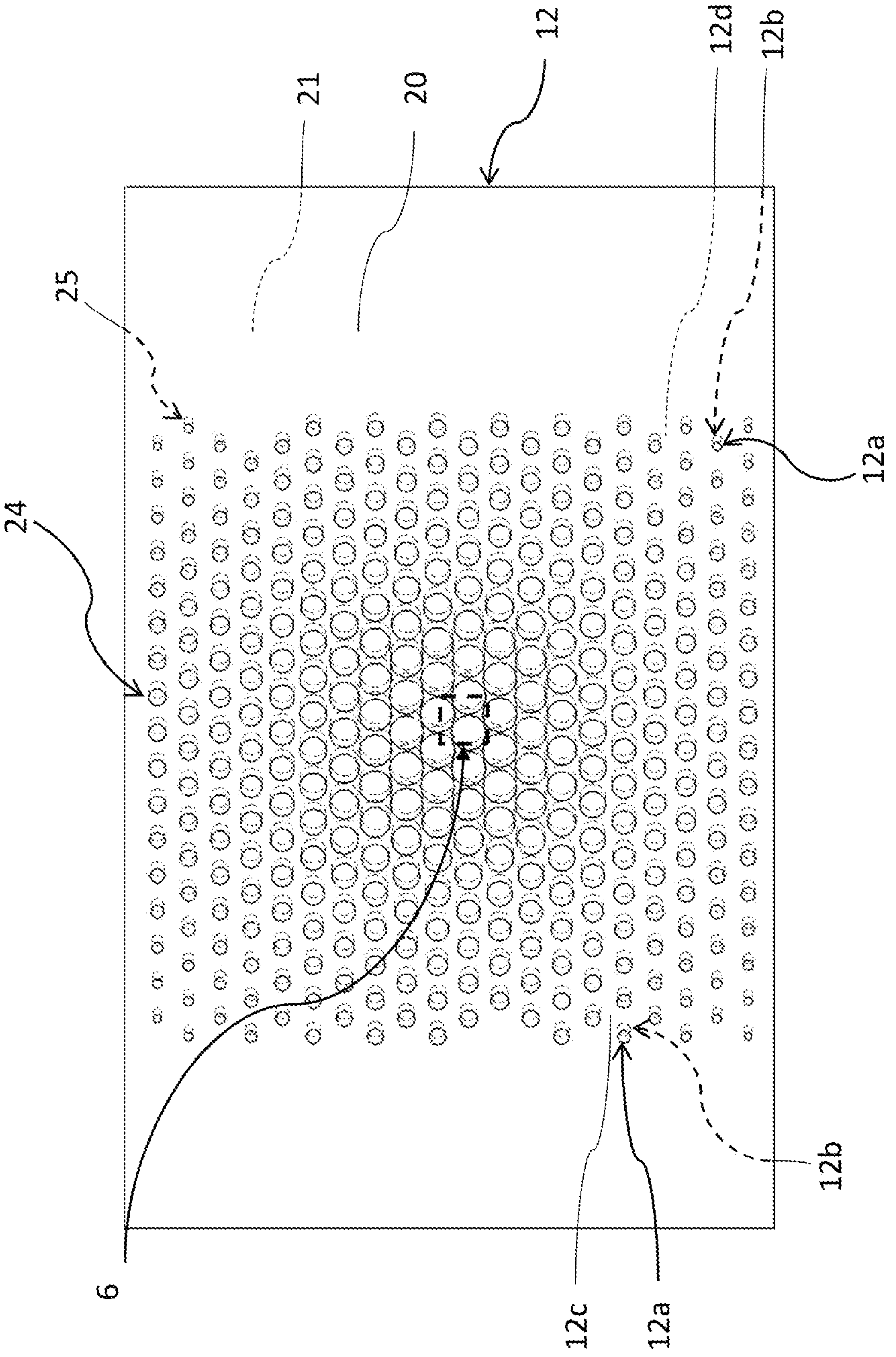
Figure 7:
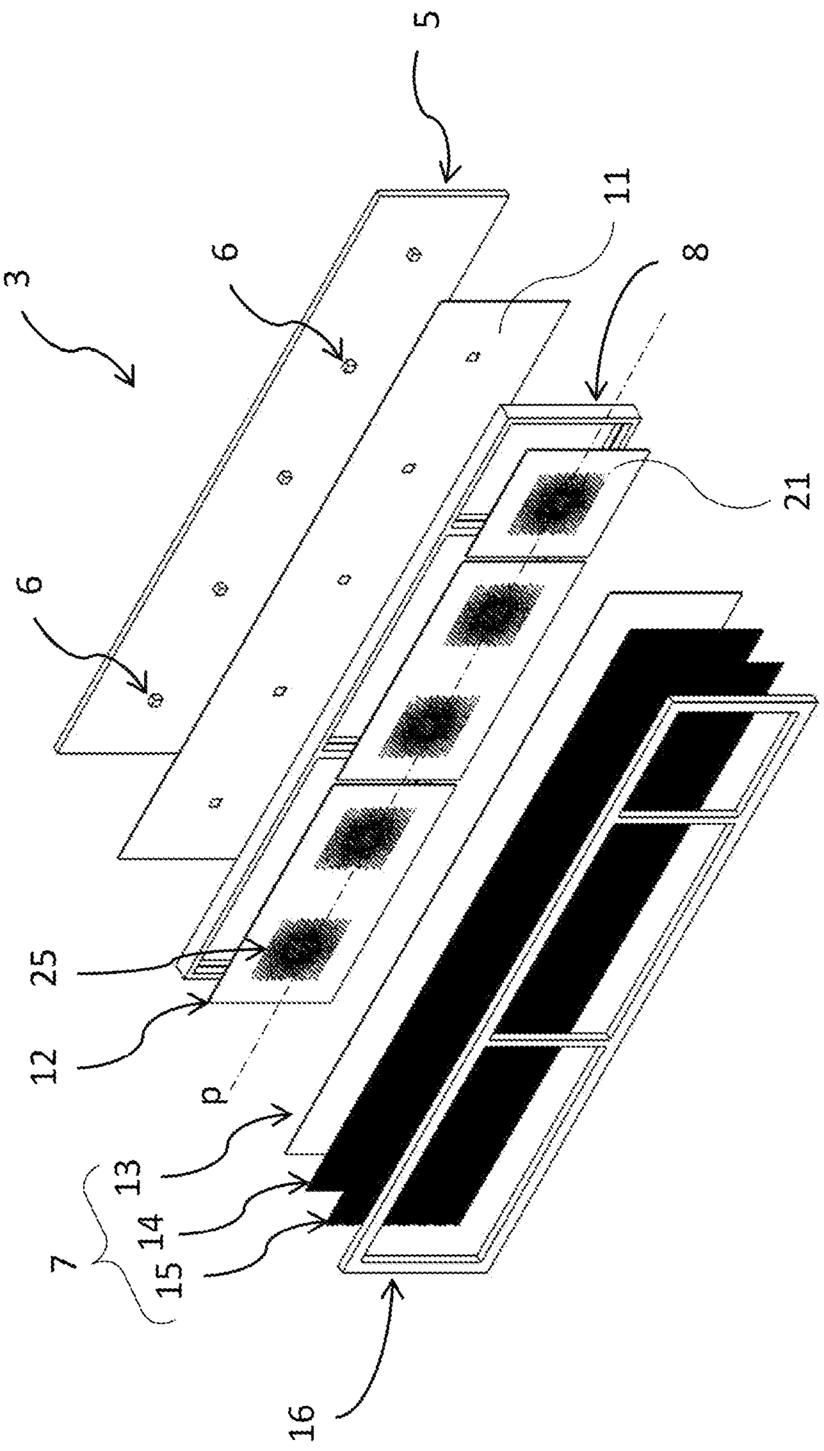
Figure 8:
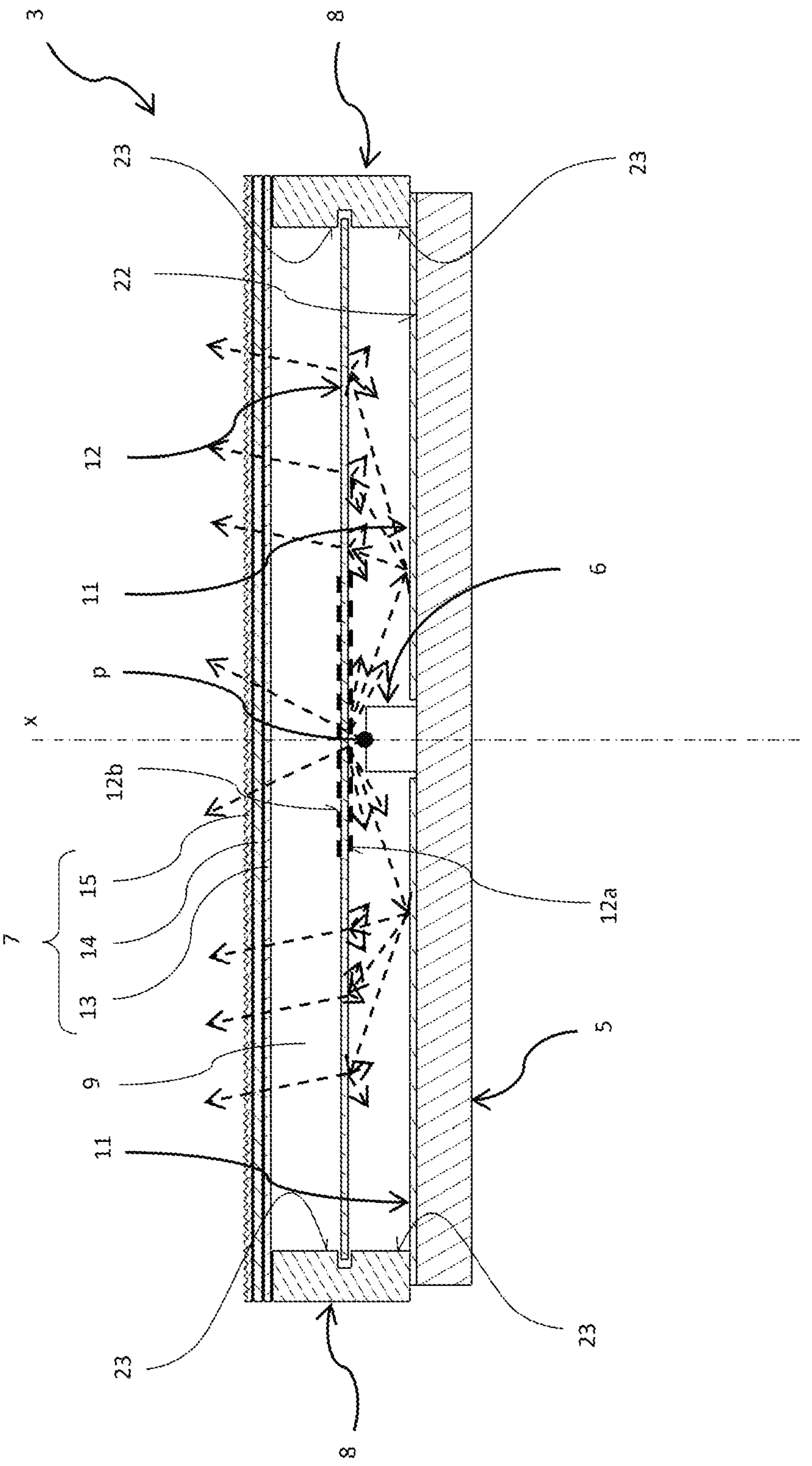

The present invention will be further clarified in more detail with the use of its embodiment examples referring to the enclosed drawings wherein:

FIG. 1 shows an example of signal light device according to the invention,

FIG. 2 shows an embodiment example of a signal lighting unit to be incorporated in a signal light device according to the invention, in a cross-section taken along the plane perpendicular to the longitudinal axis of the signal lighting unit and passing through the light source shown, FIG. 3 shows detail A of FIG. 2, FIG. 4 shows an example of the first arrangement or pattern of the first reflective surfaces and first gaps created on the input surface of the thin-walled partition panel, FIG. 5 shows another example of the first arrangement or pattern of the first reflective surfaces and first gaps created on the input surface of the thin-walled partition panel, FIG. 6 shows another example of the first arrangement or pattern of the first reflective surfaces and first gaps created on the input surface, and the second arrangement or pattern of the second reflective surfaces and second gaps created on the output surface of the thin-walled partition panel, and the mutual position of the first and second arrangements -patterns, FIG. 7 shows example of the signal lighting unit that can be incorporated in the signal light device of FIG. 1 according to the invention, in an exploded state showing individual parts of the signal lighting unit, FIG. 8 shows signal lighting unit of FIG. 7 in a cross-section taken along the plane perpendicular to the longitudinal axis of the signal lighting unit and passing through one of the light sources shown in FIG. 7.

EXAMPLES OF EMBODIMENTS OF THE INVENTION

FIG. 1 shows an example of embodiment of a signal light device 1 according to the present invention, and FIG. 2 shows an embodiment example of a signal lighting unit 3 that can be incorporated in the signal light device 1 of the invention, in a cross-section taken along the plane perpendicular to the longitudinal axis p (FIG. 8) of the signal lighting unit 3 and passing through the light source 6 shown. Signal light device 1 is designed to fulfil one or more signal light functions, such as brake light, tail light, daytime running light, direction indication light etc.

A signal light device 1 comprises a housing la covered by transparent or translucent cover 2 which separates and protects the signal light device 1 from external surroundings of the motor vehicle, the inner chamber 4 delimited by the housing la and the cover 2 and comprising at least one signal lighting unit 3. The signal light device 1 is designed to be built in the car body, and therefore, the cover 2 is in most applications curved to fit structurally or aesthetically to a shape of surrounding car body. Since the cover protects the interior of the signal light device 1 from dust, particles, water mud, etc. also during car driving, it must fulfil relevant prescriptions as to its physical and material properties such as crack strengths and also requirements for a way it permanently deforms in case of car accidents to reduce the danger of fragments to people.

The signal light device 1 comprises in the inner chamber 4 a lighting unit 3 that is secured to the housing 1*a*.

The lighting unit 3 comprises:

(i) a carrier 5 with a supporting surface 22 to attach at least one light source 6 to emit light rays 10, (ii) a front panel 7, one of which surfaces faces the cover 2 and the other surface is opposed to the supporting surface 22, and (iii) a thin-walled partition panel 12 situated between the supporting surface 22 and the front panel 7 and at a distance from them.

The thin-walled partition panel 12 comprises an input surface 20 facing the supporting surface 22 and an output surface 21 opposite the input surface 20. The supporting surface 22 is fitted with the main reflective surface 11 to reflect light rays 10. The space between the front panel 7 and the output surface 21 and between the supporting surface 22 with the said at least one light source 6 and the input surface 20 is only filled with air.

For each light source 6, the thin-walled partition panel 12 is, in the region situated opposite the light source 6, fitted on its input surface 20 with the first arrangement 24 of the first reflective surfaces 12*a* and the first gaps 12*c* between the first reflective surfaces 12*a*, and on its output surface 21 with the second arrangement 25 of the second reflective surfaces 12*b* and the second gaps 12*d* between the second reflective surfaces 12*b*. The first and second reflective surfaces 12*a*, 12*b* are configured to reflect light rays 10 and the first and second gaps 12*c*, 12*d* are configured to transmit light rays 10. The said first arrangement 24 and the second arrangement 25 are configured to achieve a pre-determined intensity distribution of the output of light rays 10 from individual places of the output surface 21 of the thin-walled partition panel 12. The lighting unit 3 is terminated with a front frame 16 at the front. The purpose of the frame 16 is generally aesthetical but the frame 16 also can serve to strengthen the structure, hide some parts that are not to be seen from outside the car etc.

FIG. 2 shows an embodiment example of the lighting unit 3 in a cross-section taken along the plane perpendicular to the longitudinal axis p of the lighting unit 3 and passing through the light source 6 shown. The lighting unit 3 comprises a carrier 5 of the light source 6 defining the inner chamber 9 together with the lateral cover 8 and the front panel 7, which is permeable for light rays 10. The inner chamber 9 is partitioned with a thin-walled partition panel 12, situated with its input surface 20 opposite the supporting surface 22 of the carrier 5. The light source 6 is attached to the supporting surface 22, or it is partly embedded in it. The thickness of the thin-walled partition panel 12 is preferably up to 2.5 mm. Preferentially, as the thin-walled partition panel 12, optical foil is used. The inner chamber 9 is filled with air.

The front panel 7 preferably consists of several optical foil sheets stacked on each other, as will be described with reference to other embodiments of the invention. The supporting surface 22 of the carrier 5 is fitted with a reflective surface 11 that may be continuous and cover the whole supporting surface 22 except the place where the light source 6 is situated. The focal point of the light source 6, which is preferably a LED type source, is situated in the immediate vicinity of the thin-walled partition panel 12, preferably at a distance from 0.5 mm to 5 mm from the thin-walled partition panel 12.

As indicated by the preferred embodiment of FIG. 2, the carrier 5 may be of a plate-like shape wherein the front panel 7 and the carrier 5 may be approximately parallel to each other and to the thin-walled partition panel 12. However, in other embodiments, the carrier 5 and the front panel 7 may be slightly divergent while the carrier 5 does not need to be of a plate-like shape.

Thus, in the preferred embodiment of FIG. 2, the lighting unit 3 as a whole forms a plate-like body, preferably with a thickness from 2 mm to 12 mm wherein the distance between the reflective surface 11 and the thin-walled partition panel 12 is preferably from 0.5 mm to 5 mm and the distance between the thin-walled partition panel 12 and the front panel 7 is preferably between 0.5 mm and 5 mm. Thus, the inventive solution makes it possible to achieve a very small overall thickness of the lighting unit 3, which minimizes the requirements for the installation space of the lighting unit 3 in the light device of the vehicle.

This invention assumes that the term "panel" (front panel 7, thin-walled partition panel 12) comprises both "planar" panels (i.e. panels with two planar opposite largest surfaces), and curved panels—bent or corrugated (i.e. panels with two curved opposite largest surfaces).

The reflective surface 11 may be created in such a way that it is the entire supporting surface 22 of the carrier 5 adapted to exhibit excellent reflective characteristics. Alternatively, the reflective surface 11 may be produced by application of a highly reflective layer on the supporting surface 22 of the carrier 5, application of white colour coating etc. Preferably, the inner surface of the lateral cover 8, i.e. surface facing the inner chamber 9 is also fitted with a lateral reflective surface 23, which may be produced similarly to the reflective surface 11 of the carrier 5. The reflective surface 11 of the carrier 5 is used to reflect light rays 10 that have been generated by the light source 6 and fallen on the reflective surface 11. Alternatively, the reflective surface 11, and possibly also the lateral reflective surface 23, may be adapted to diffusion reflection of light rays 10.

FIG. 3 shows detail A of FIG. 2. As indicated by this figure, the thin-walled partition panel 12 is fitted on its input surface 20 facing the light source 6 with the first reflective surfaces 12*a* and on its output surface 21 averted from the light source 6 with the second reflective surfaces 12*b*. The first and second reflective surfaces 12*a*, 12*b* do not completely cover the input and output surfaces 20, 21, but are respectively arranged with the first and second gaps 12*c*, 12*d* between them. The input and output surfaces 20, 21 are permeable for light rays 10 in the locations of these gaps 12*c*, 12*d*. From the point of view of propagation of light rays 10 immediately after their exit from the light source 6, light rays 10 may be classified into three groups: the first light rays 17 that pass through the thin-walled partition panel 12 without falling onto one of the reflective surfaces 12*a* and 12*b* before that; the second light rays 18 that get reflected from the first reflective surfaces 12*a* and subsequently fall onto the reflective surface 11 of the carrier 5; and the third light rays 19 that penetrate into the body of the thin-walled partition panel 12, but are subsequently reflected from a second reflective surface 12*b* either out of the thin-walled partition panel 12 onto the reflective surface 11 of the carrier 5, or from a second reflective surface 12*b* immediately onto a first reflective surface 12*a*, from which they get reflected either into one of the second gaps 12*d* on the output surface 21 and out of the thin-walled partition panel 12, or onto one of the second reflective surfaces 12*b* again. Preferably, the first and second reflective surfaces 12*a*, 12*b* are configured to exhibit excellent reflective characteristics while alternatively, the first reflective surfaces 12*a* and/or the second reflective surfaces 12*b* may be adapted to diffusion reflection of light rays 10.

Thus, all along the width of the lighting unit 3, there is continuous reflection of light rays 10 emitted by the light source 6, which is advantageously a LED type source, and partial transmission of light rays 10 through the thin-walled partition panel 12. The mutual arrangement of the first reflective surfaces 12*a* and the second reflective surfaces 12*b*, their size, distribution on the input surface 20 and output surface 21 of the thin-walled partition panel 12 and location of the first reflective surfaces 12*a* with respect to the second reflective surface 12*b* and to the light source 6 can be used to influence the distribution of the output of light rays 10 from individual places of the output surface as well as the direction of their output 21 to a certain extent. This means that a suitable arrangement of the first and second reflective surface 12*a*, 12*b* with respect to each other and the light source 6 and the selection of their suitable size can be used to achieve a pre-determined distribution of intensity of the said output of light rays 10.

The other figures show examples of the first arrangement 24 of the first reflective surfaces 12*a* and the first gaps 12*c* as well as an example of the second arrangement 25 of the second reflective surfaces 12*b* and second gaps 12*d* in particular patterns configured with the intention to achieve a uniform—homogeneous output of light rays 10 from the output surface 21 of the thin-walled partition panel 12.

FIG. 4 shows a view of the input surface 20 of the thin-walled partition panel 12 of the lighting unit 3. The input surface 20 is fitted with the first reflective surface 12*a*, which are of a circular shape in this embodiment example. The first reflective surfaces 12*a* may be for instance implemented as white print. Between individual first reflective surfaces 12*a*, there are the first gaps 12*c* where the input surface 20 is permeable for light rays 10, which may penetrate through the input surface 20 into the body of the thin-walled partition panel 12, or conversely exit from the body of the thin-walled partition panel 12 this way, as explained above with reference to FIG. 3, after being reflected from the second reflective surfaces 12*b*. The proportion of the total area of the first reflective surfaces 12*a* to the total area of the first gaps 12*c* present on a unit area decreases in the direction from the light source 6 (not shown in FIG. 4), which is situated against the centre of the input surface 20, towards the edges of the input surface 20. Accordingly, in FIG. 4, from a certain distance from the centre of the input surface 20, the first reflective surfaces 12*a* are not shown at all as they become points of a decreasing size situated further and further away from each other. The said arrangement makes sure that in the region of the input surface 20 centre, which is found opposite the light source 6, the predominant presence of the first reflective surfaces 12*a* counterbalances the concentration of the light rays 10 and their incidence angle in this region, which would, without this counterbalance, result in by far the highest concentration of passage of light rays 10 out of the output surface 21 of the thin-walled partition panel 12 in this region. The said counterbalance, however, in cooperation with the arrangement of the second reflective surfaces 12*b* on the output surface 21 of the thin-walled partition panel 12, makes sure that the passage of light rays 10 through the output surface 21 is uniform—homogeneous all over the output surface 21.

FIG. 5 shows another embodiment of the arrangement of the first reflective surface 12*a* on the input surface 20 of the thin-walled partition panel 12 of the lighting unit 3. The purpose of this arrangement of the first reflective surfaces 12*a* is, similarly to the preceding embodiment, in cooperation with the arrangement of the second reflective surfaces 12*b* on the output surface 21, to achieve homogeneous output of light rays 10 from the output surface 21. In this arrangement, the first gaps 12*c*, designed for transmission of light rays 10, through the input surface 20, have the shape of hexagons while the first reflective surfaces 12*a* fill the remaining area of the input surface 20 between the first gaps 12*c*. The first reflective surfaces 12*a* may be for instance implemented as white print. Thus, this is a kind of inverted arrangement with respect to the first embodiment. With the distance from the centre of the input surface 20, against which the light source 6 (not shown in FIG. 5) is situated), the size of the first gaps 12*c*—hexagons increases and the distance between adjacent hexagons decreases. For simplicity, from a certain size of the hexagons, the first gaps 12*c* are no longer shown in FIG. 5 as they essentially represent a continuous area of the input surface 20. Light rays 10 may penetrate through the first gaps 12*c*—hexagons through the input surface 20 into the body of the thin-walled partition panel 12, or conversely exit from the body of the thin-walled partition panel 12, as explained above with reference to FIG. 3, after being reflected from the second reflective surfaces 12*b*.

As regards the second reflective surfaces 12*b* and the second gaps 12*b* between them, which the output surface 21 of the thin-walled partition panel 12 is fitted with, they are organized in the second arrangement that may be identical to the first arrangement, i.e. the arrangement of the first reflective surfaces 12*a* and the first gaps 12*c* on the opposite input surface 20 of the thin-walled partition panel 12. Here, the first arrangement—pattern of the first reflective surfaces 12*a* may be positioned exactly in alignment with the identical second arrangement—pattern of the second reflective surfaces 12*b*, or the first arrangement and the second arrangement may be positioned with a mutual offset/shift as such an embodiment example is shown in FIG. 6. Alternatively, on the input surface 20 and the output surface 21, the first arrangement and the second arrangement may be used that are different from each other. The first arrangement and the second arrangement and their mutual positioning are, however, always selected in such a way to achieve pre-determined intensities of the output of light rays 10 from individual locations of the output surface 21 out of the thin-walled partition panel 12. In the case of the embodiment examples shown in FIGS. 4, 5 and 6, the intention was to make the output homogeneous, i.e. to make the intensity of the output of light rays 10 from the output surface 21 approximately equal in all locations of the output surface 21.

Thus, the inventive solution makes it possible to use the selection of the first arrangement, i.e. arrangement of the patterns of the first reflective surfaces 12*a* and the first gaps 12*c* on the input surface 20, and the second arrangement, i.e. arrangement of the second reflective surfaces 12*b* and the second gaps 12*d* on the output surface 21, and the mutual positioning of the first and second arrangements 24, 25, to control the passage of light through the thin-walled partition panel 12—preferably foil to influence homogeneity of the optical system.

FIG. 7 shows another example of the lighting unit 3 and its parts in an exploded state. In this embodiment example, the lighting unit 3 comprises one carrier 5, which is a PCB on which five light sources 6 of the LED type are attached.

The LED sources are situated next to each other in the direction of the longitudinal axis p of the lighting unit 3. The main reflective surface 11 is created with the use of a layer with reflective characteristics situated on the carrier 5. In front of each of the LED sources, on the input surface 20 of the thin-walled partition panel 12, there is the first arrangement 24 of the first reflective surfaces 12*a* and the first gaps 12*c*, and on the output surface 21, there is the second arrangement 25 of the second reflective surfaces 12*b* and the second gaps 12*d*. In front of the thin-walled partition panel 12, the front panel 7 is situated, which in this embodiments consists of a diffusion layer 13, the first functional layer 14 and the second functional layer 15 in this order from the partition panel 12. The diffusion layer 13 is adapted to diffuse light rays 10, and the first and second functional layers 14, 15 are preferentially layers—foils of the BEF ("Brightness Enhancement Film") type, known from the prior art, which are used to enhance brightness in a certain direction(s) of view of the foil and when two such foils are used, the foils are placed on each other with a mutual angular shift of 90°. The lighting unit 3 further comprises a front frame 16 to secure the position of the front panel 7, and a lateral cover 8 to secure the position of the thin-walled partition panel 12—optical foil. The thin-walled partition panel 12 may consist of one integral body, or it may consist of multiple parts arranged next to each other in the direction of the longitudinal axis p of the lighting unit 3, especially if, to increase the rigidity of the overall structure of the lighting unit 3, a structured lateral cover 8 is used to house parts of the thin-walled partition panel 12, as shown in the embodiment example of FIG. 7.

FIG. 8 shows the embodiment of the lighting unit 3 of FIG. 7 in the assembled state and in a cross-section taken along the plane perpendicular to the longitudinal axis p of the lighting unit 3 and passing through one of the light sources 6 shown in FIG. 7.

LIST OF REFERENCE MARKS

1—signal light device
1*a*—housing
2—cover
3—signal lighting unit
4—inner chamber
5—carrier
6—light source
7—front panel
8—lateral cover
9—chamber
10—light ray
11—main reflective surface
12—thin-walled partition panel
12*a*—first reflective surface
12*b*—second reflective surface
12*c*—first gap
12*d*—second gap
13—diffusion layer
14—first functional layer
15—second functional layer
16—front frame
17—first ray
18—second ray
19—third ray
20—input surface
21—output surface
22—supporting surface
23—lateral reflective surface
24—first arrangement
25—second arrangement
p—longitudinal axis of the lighting unit
x—optical axis of the beam of light rays

The invention claimed is:

1. A signal light device of a motor vehicle designed to fulfil one or more signal light functions, comprising a housing covered by transparent or translucent cover which separates and protects the signal light device from external surroundings of the motor vehicle, an internal chamber delimited by the housing and the cover, and at least one signal lighting unit, wherein the signal lighting unit comprises:

(i) a carrier with a supporting surface to which at least one light source is attached to emit light rays, (ii) a front panel, one of which surfaces faces the cover and the other surface is opposed to the supporting surface, and (iii) a thin-walled partition panel situated between the supporting surface and the front panel and at a distance from them, wherein the thin-walled partition panel comprises an input surface facing the supporting surface and an output surface opposite the input surface, wherein the supporting surface is fitted with a main reflective surface to reflect light rays, wherein the space between the front panel and the output surface and between the supporting surface with the said at least one light source and the input surface is filled with air, wherein the thin-walled partition panel is, in the region situated opposite the at least one light source, fitted on its input surface with a first arrangement of discrete first reflective surfaces and first gaps between the first reflective surfaces, and on its output surface with a second arrangement of discrete second reflective surfaces and second gaps between the second reflective surfaces, wherein the first and second reflective surfaces are configured to reflect light rays and the first and second gaps are configured to transmit light rays, and wherein the first arrangement of reflective surfaces and the second arrangement reflective surfaces are configured to achieve a pre-determined intensity distribution of the output of light rays from individual places of the output surface of the thin-walled partition panel.

2. The signal light device of a motor vehicle according to claim 1, wherein the thickness of the thin-walled partition panel is less than or equal to 2.5 mm.

3. The signal light device of a motor vehicle according to claim 1, wherein the cover is plate-like shaped and is planar or curved, and the front panel is planar or curved.

4. The signal light device of a motor vehicle according to claim 1, wherein the front panel is approximately parallel to an opposing part of the cover.

5. The signal light device of a motor vehicle according to claim 1, wherein the thin-walled partition panel is optical foil.

6. The signal light device of a motor vehicle according to claim 1, wherein the thin-walled partition panel, the main reflective surface and the front panel are approximately parallel and at the same time curved or planar.

7. The signal light device of a motor vehicle according to claim 1, wherein the distance between the main reflective surface and the thin-walled partition panel is 0.5 mm to 5.0 mm, and the distance between the thin-walled partition panel and the front panel is between 0.5 mm and 5 mm.

8. The signal light device of a motor vehicle according to claim 1, wherein the lighting unit has a plate-like shape and is planar or curved.

9. The signal light device of a motor vehicle according to claim 1, wherein thickness of the lighting unit is from 2 mm to 12 mm.

10. The signal light device of a motor vehicle according to claim 1, further comprising a lateral cover that closes the lighting unit from a side.

11. The signal light device of a motor vehicle according claim 10, wherein the inner walls of the lateral cover are fitted with lateral reflective surfaces to reflect light rays.

12. The signal light device of a motor vehicle according to claim 1, wherein the main reflective surface consists of a layer applied on the supporting surface of the carrier.

13. The signal light device of a motor vehicle according to claim 1, wherein the optical axis (x) of the beam of light rays emitted from the light source is perpendicular to the thin-walled partition panel and to the reflective surface.

14. The signal light device of a motor vehicle according to claim 1, further comprising a plurality of light sources carried by a common carrier.

15. The signal light device of a motor vehicle according to claim 14, wherein the plurality of light sources are situated on the carrier spaced by gaps and arranged in the direction of the longitudinal axis (p) of the lighting unit.

16. The signal light device of a motor vehicle according to claim 1, wherein the light source is a source of the LED type.

17. The signal light device of a motor vehicle according to claim 16, wherein the focal point of the light source of the LED type is situated at a distance from 0.5 mm to 5 mm from the thin-walled partition panel.

18. The signal light device of a motor vehicle according to claim 1, wherein the carrier is a PCB.

19. The signal light device of a motor vehicle according to claim 1, wherein the thin-walled partition panel comprises several parts arranged next to each other in the direction of the longitudinal axis (p) of the lighting unit and the lateral cover is structured to embed individual parts of the thin-walled partition panel in the lateral cover to enhance rigidity of the overall structure of the lighting unit.

20. The signal light device of claim 12, wherein the layer applied on the supporting surface of the carrier is a white color coat.

* * * * *